I. RATHGEBER.
FORE MASHER.
APPLICATION FILED MAY 15, 1908.
899,841.
Patented Sept. 29, 1908.
2 SHEETS—SHEET 2.
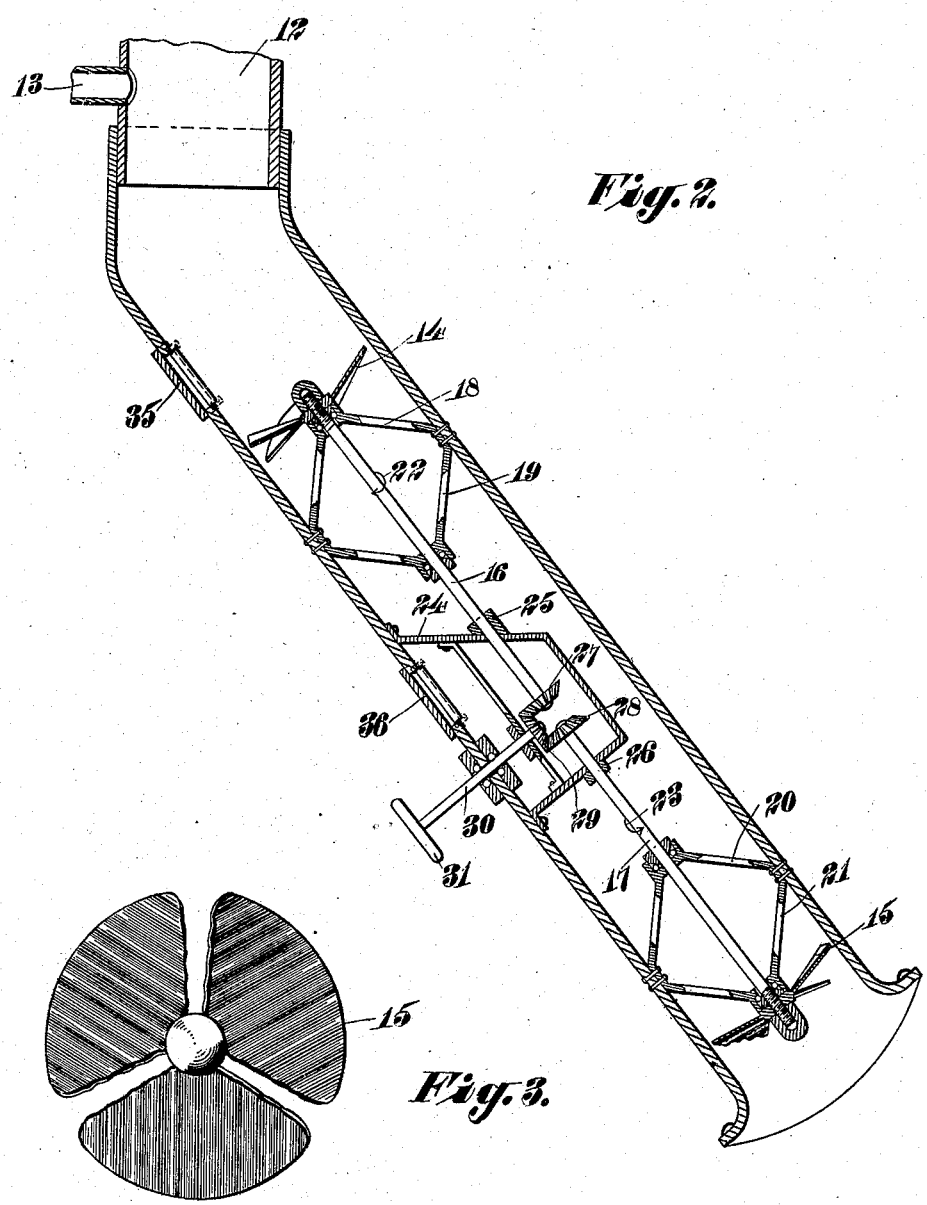
Witnesses;
A. A. Olson
W. E. Smith
Inventor;
Isidor Rathgeber
by
Joshua R. H. Potts,
Atty.

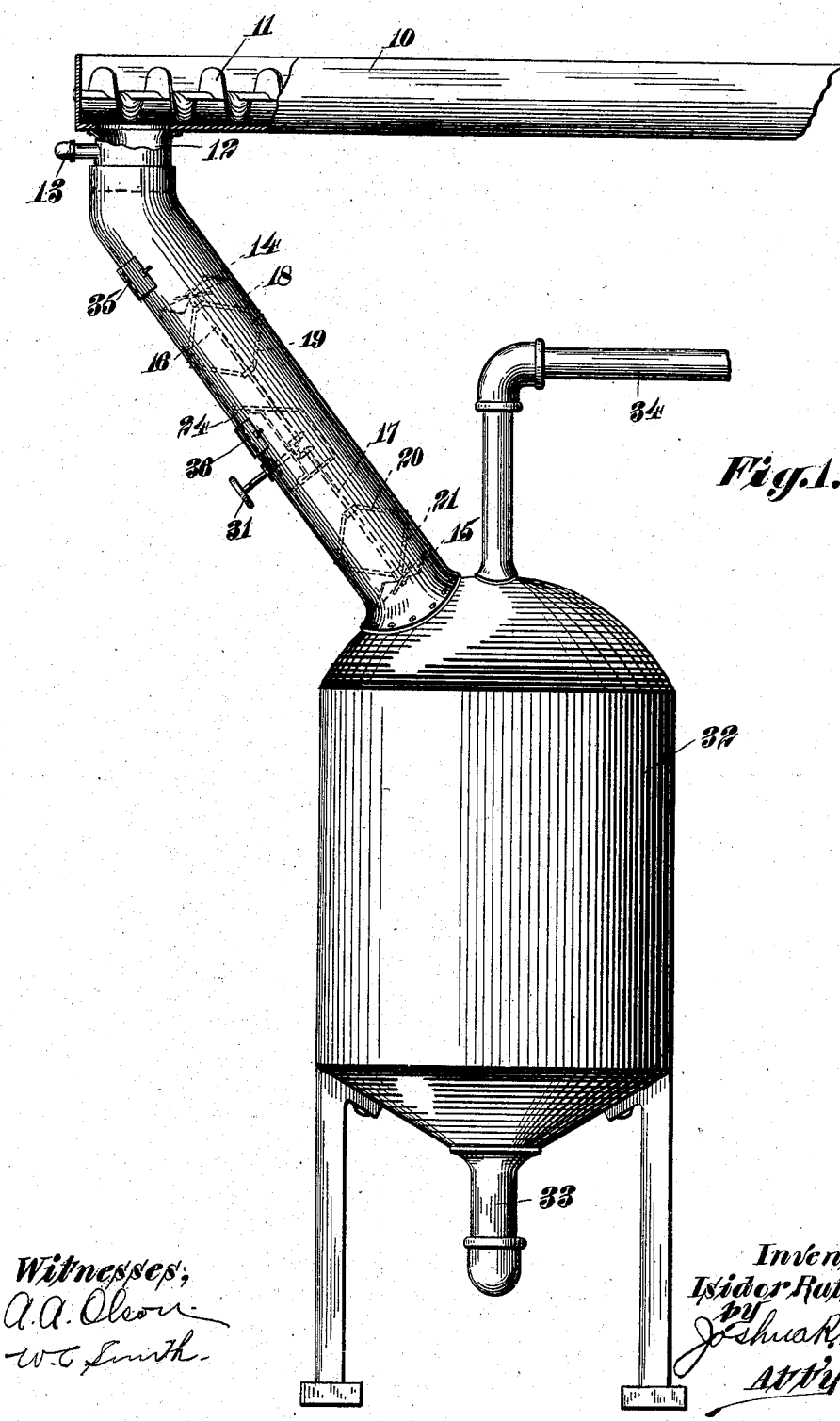

UNITED STATES PATENT OFFICE.

ISIDOR RATHGEBER, OF ROCK ISLAND, ILLINOIS.

FORE-MASHER.

No. 899,841.  Specification of Letters Patent.  Patented Sept. 29, 1908.

Application filed May 15, 1908. Serial No. 432,964.

*To all whom it may concern:*

Be it known that I, ISIDOR RATHGEBER, a citizen of the United States, residing at Rock Island, county of Rock Island, and State of Illinois, have invented certain new and useful Improvements in Fore-Mashers, of which the following is a specification.

My invention relates to an improved malt mixing apparatus or foremashers of which the following is a full, clear and exact description, reference being had to the accompanying drawings, forming a part of this specification.

Figure 1 is a diagrammatic view of my device as applied to a mash tub, Fig. 2 is a detail drawing of the spout of the mash tub, which spout contains the apparatus which is peculiar to my invention, Fig. 3 is a plan view of the lower turbine showing its corrugations.

It has hitherto been the practice in making malt extracts to charge the mash tub with a sufficient quantity of water, and to add thereto the dry malt. The mash tub contains means for agitating this mixture of malt and water, either by hand or steam power. In my invention, I provide means for obtaining this mixture before the malt and water enter the mash tub, and also accomplish another object, that of dispensing with the mechanical power necessary to agitate the mixture, since my mixing means consists of two turbines which are driven by the force of the water as it runs down the spout.

In Fig. 1 is shown the customary malt conveyer 10, containing a screw 11, the rotation of which conveys the malt from a suitable chamber to the opening of the spout 12. At the top of this spout 12, is a pipe 13, through which the water is admitted. In this spout 12, I have provided two turbine wheels 14 and 15. These wheels are mounted on shafts 16 and 17 running in suitable supports 18, 19, 20 and 21 which are brackets secured to the walls of the spout and having bearings for the respective shafts. The bearings of these supports shown more in detail in Fig. 2, are provided with ball bearings. The turbines 14 and 15 have a pitch like that of a screw propeller, so that the water pouring past them will cause them to rotate. This pitch is different for each turbine, the pitch of the upper one to be such as to cause it to rotate in the direction of the arrow 22, and that of the lower one to cause it to rotate in the direction of the arrow 23. In order to secure uniform rotation of these turbines 14 and 15 with respect to each other, I have provided in the spout 12, a chamber 24. In the walls of this chamber are stuffing-boxes 25 and 26, in which run the shafts 16 and 17. On the shafts 16 and 17 are the beveled gears 27 and 28, and engaging with the gears is the bevel 29, attached to the shaft 30, which shaft runs in ball bearings. On the end of the shaft 30 which projects outside of the spout 12, is the indication wheel 31. It will now be seen that the system of gears 27, 28 and 29, will cause the two turbines 14 and 15 to revolve in opposite directions with equal velocity, and also cause the indicating wheel 31 to turn, thereby giving an indication if the turbines are operating properly.

The spout 12 is provided with doors 35 and 36, by means of which access can be had to the interior of the spout and gear case, for the purposes of cleaning.

The lower turbine 15 is made of corrugated metal and will thereby more effectually mix the descending grain with the water. This mixture of grain and water will fall into the mash tub 32, which is provided with the customary steam pipes 33 and 34. Since my invention relates only to the mixing of the malt and the water, I do not think it necessary to describe the further operations on this mixture, since they are well known to those skilled in the art.

Many advantages result from my invention, since by mixing the malt and water when they first come in contact, and before they enter the mash tub, I am able to utilize the large percentage of malt extract which has hitherto been lost in the malt dust. By providing the turbine to do the mixing, I am able to use the force of the falling water as it runs through the spout thereby avoiding the mechanical stirrers which have hitherfore been used. By employing the turbines revolving in reverse directions, I am able to get a very effectual mixing, and my mixing apparatus is in a position where it can be easily cleaned.

Many departures can be made from the precise apparatus I have shown by those skilled in the art without departing from the spirit of my invention.

Having described my invention what I claim as new, and desire to secure by Letters Patent, is:

1. In a foremasher, the combination of a source of malt, a source of liquid, a cylindrical spout common to said sources leading to a mash tub, and a pair of turbines revolving in opposite directions in said spout upon an axis coinciding or parallel with the axis of said spout and adapted to mix said liquid and malt during their passage through said spout, substantially as described.

2. In a foremasher, the combination of a source of malt, a source of liquid, a spout common to said sources leading to a mash tub, and a pair of turbines in said spout adapted to revolve in opposite directions by the passage of said liquid and said malt through said spout and the second turbine being driven from the first, substantially as described.

3. In a foremasher, the combination of a source of malt, a source of liquid, a spout common to said sources leading to a mash tub, and a pair of turbines in said spout geared together, substantially as described.

4. In a foremasher, the combination of a source of malt, a source of liquid, a spout common to said source leading to a mash tub, a pair of turbines in said spout geared together, and an indicating wheel revolved with said turbines, substantially as described.

5. In a foremasher, the combination of a source of malt, a source of liquid, a spout common to said sources leading to a mash tub, a pair of turbines in said spout adapted to be revolved by the passage of said liquid and said malt through said spout, one of the turbines being corrugated, substantially as described.

6. In a foremasher, the combination of a source of malt, a source of liquid, a cylindrical spout common to said sources and leading to a mash tub, a pair of shafts arranged in axial alinement within said spout, a turbine upon each of said shafts and gearing connecting the adjacent ends of said shafts, substantially as described.

In testimony whereof I have signed my name to this specification in the presence of two subscribing witnesses.

ISIDOR RATHGEBER.

Witnesses:
  M. HELLPENSTELL,
  WM. T. HARTZ.